Jan. 4, 1927.                                                 1,613,566
L. MELANOWSKI
POWER TRANSMITTING MECHANISM
Filed April 9, 1919           3 Sheets-Sheet 1

Inventor
Leo Melanowski,
By Edward R. Alexander
Attorney

Jan. 4, 1927.  
L. MELANOWSKI  
1,613,566  
POWER TRANSMITTING MECHANISM  
Filed April 9, 1919  3 Sheets-Sheet 2

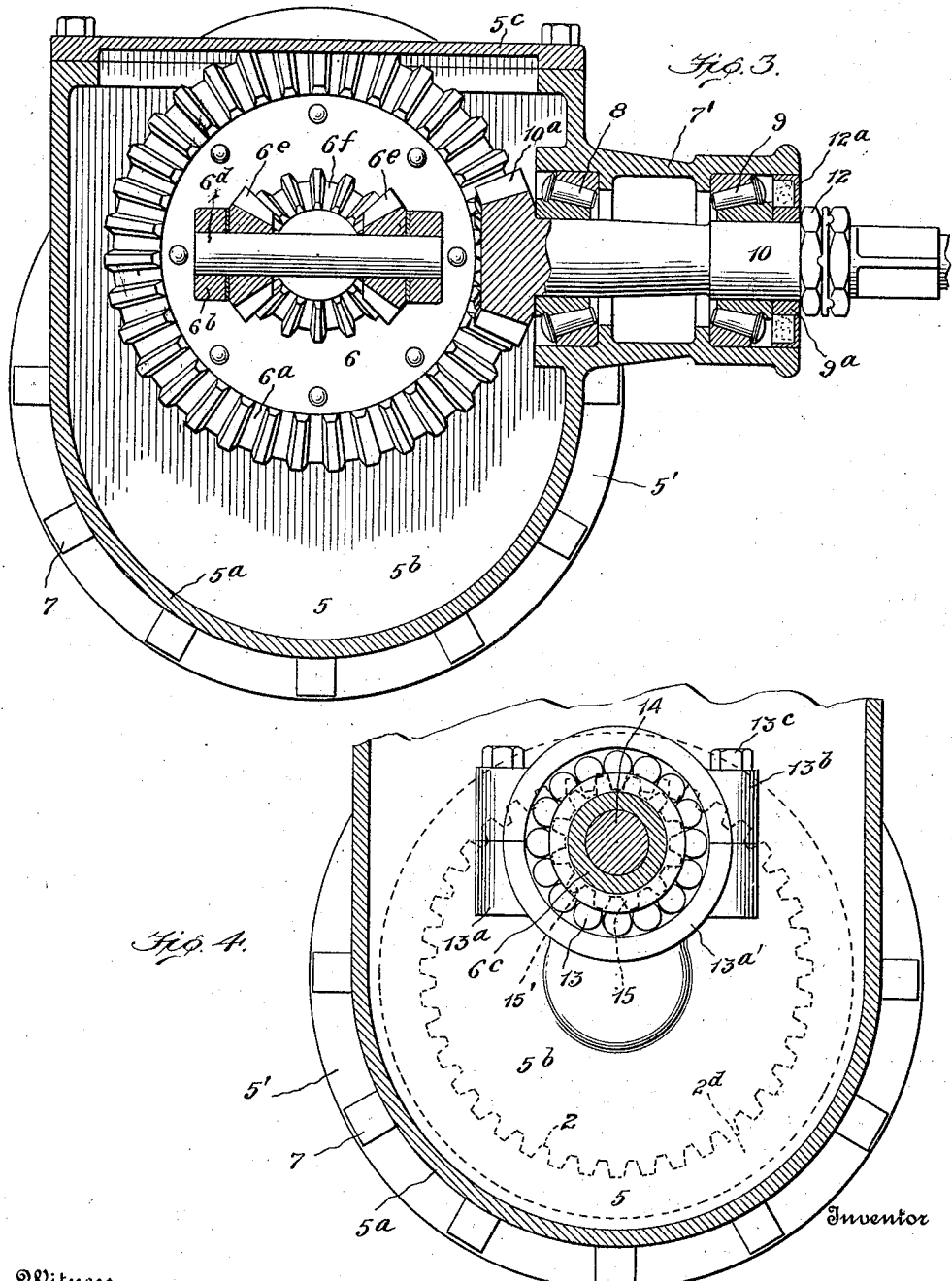

Patented Jan. 4, 1927.

1,613,566

UNITED STATES PATENT OFFICE.

LEO MELANOWSKI, OF CLEVELAND, OHIO, ASSIGNOR TO THE UNION TRUST COMPANY, OPERATING TRUSTEE, OF CLEVELAND, OHIO, A CORPORATION OF OHIO.

POWER-TRANSMITTING MECHANISM.

Application filed April 9, 1919. Serial No. 288,011.

This invention relates to driving or power transmitting mechanism for motor vehicles.

One object of the invention is to simplify the construction of power transmitting mechanisms for motor vehicles.

Another object of the invention is to provide a driving mechanism which may be constructed economically and assembled and disassembled in a ready manner.

Another object of the invention is to provide an improved power transmitting mechanism in which proper speed reduction is attained between the propeller shaft and driven axle of the vehicle.

Another object of the invention is to provide a driving mechanism in which the power of the engine may be transmitted to the drive axle or axles in a positive and efficient manner with minimum friction losses.

Another object of the invention is to provide a novel driving mechanism for a motor vehicle in which the axis of the propeller shaft and the axis of the driven pinion, which transmits the power to the differential, may be arranged and maintained at all times in substantially axial alignment with each other to drive the vehicle with minimum friction losses.

Other objects of the invention will be apparent to those skilled in the art to which my invention relates.

For the purpose of illustration, I have, in the accompanying drawings, shown and herein described one form of apparatus embodying my invention.

Fig. 1 is a sectional view of a power transmitting mechanism embodying my invention.

Fig. 1$^a$ is a fragmentary section on the line 1$^a$—1$^a$ of Fig. 1.

Fig. 3 is a section on the line 3—3 of Fig. 1.

Fig. 4 is a section on the line 4—4 of Fig. 1.

Figure 1:
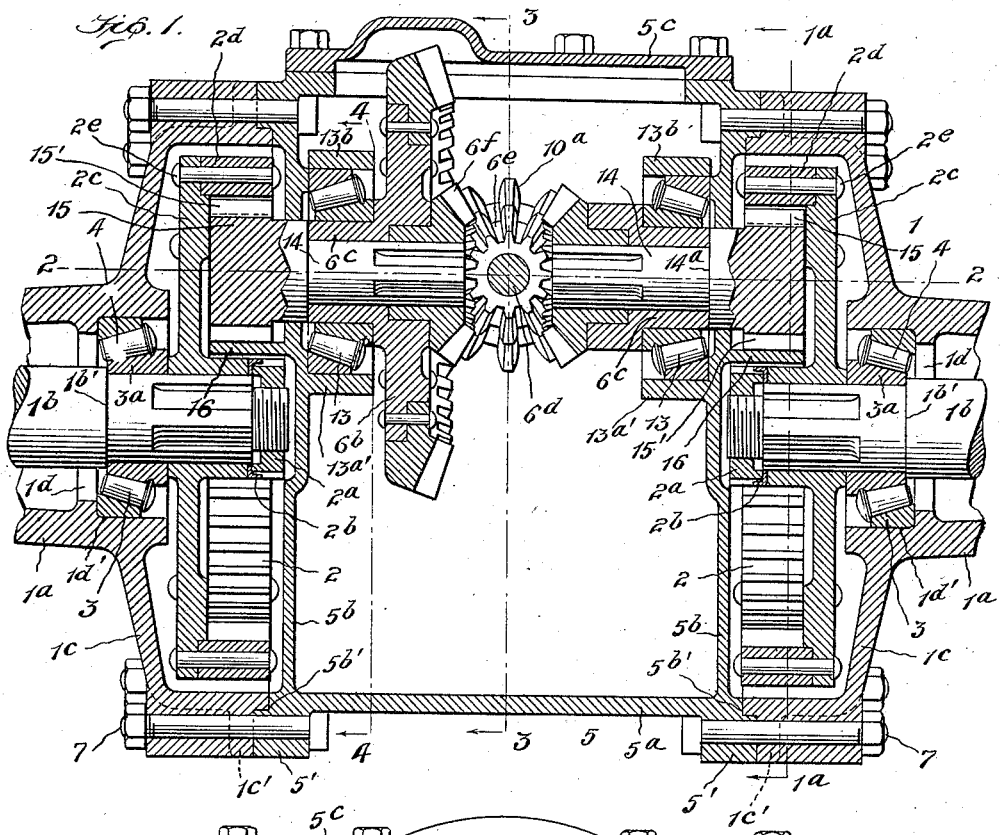
Figure 1A:
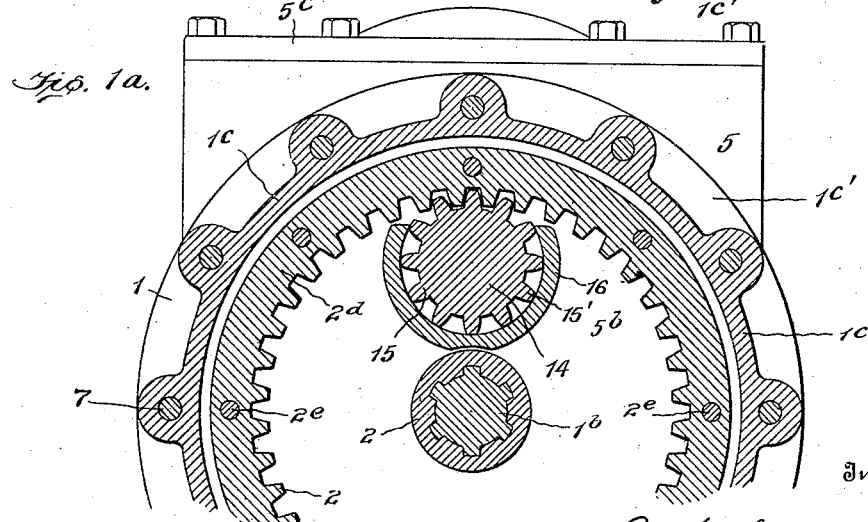
Figure 2:
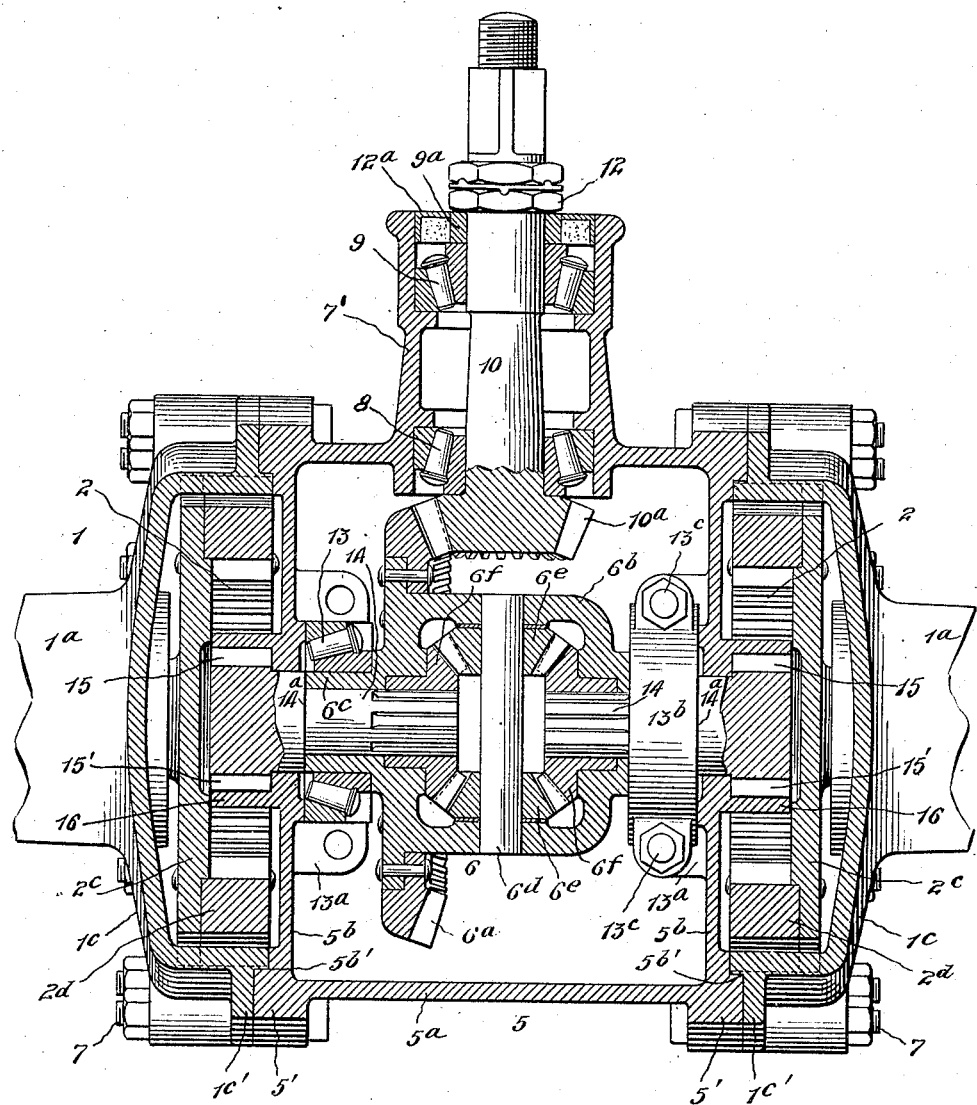
Fig. 2 is a section on the line 2—2 of Fig. 1.

In the drawings, 1 indicates as an entirety an axle or axle mechanism comprising tubular members 1$^a$, 1$^a$, and live axles or axle sections 1$^b$, 1$^b$. At its inner end, each axle 1$^b$ is provided with an internal gear 2. Each gear 2 is keyed to the adjacent axle section in any well known manner, preferably in the manner shown in Figs. 1 and 1$^a$. The gear 2 may be removably held in place on the adjacent axle by a nut 2$^a$ and lock washer 2$^b$. At 1$^c$, the inner end of each tubular member 1$^a$ is enlarged to form a housing for the adjacent internal gear 2; and at 1$^d$, each tubular member 1$^a$ is formed with an internal flange or rib to form an annular recess 1$^{d'}$ to receive an anti-friction bearing race 3. 3$^a$ indicates the other race of the bearing. Between the races 3, 3$^a$, are disposed anti-friction devices 4, preferably comprising tapered rollers which are adapted to take thrusts endwise of the axle or axle section. Each axle 1$^b$ may be reduced to form a shoulder 1$^{b'}$ against which the race 3$^a$ sets, being preferably maintained in this position by the nut 2$^a$ acting through the gear 2. Each gear 2 preferably comprises a disk or plate 2$^c$, having a hub and an annular member 2$^d$ on which the gear teeth are provided. The annular member 2$^d$ may be fixed to the disk or plate 2$^a$ in any desired manner, as by pins 2$^e$ which preferably are upset at their opposite ends.

5 indicates as an entirety a casing which encloses power transmitting devices, preferably of the differential type, indicated as an entirety at 6. The casing 5 preferably comprises an outer wall 5$^a$, side walls 5$^b$ and a cover 5$^c$. The opposite ends or sides of the casing 5 are shaped to detachably engage with the end walls of the enlargements or housings 1$^c$ and form substantially liquid tight and dust proof connections therewith. For this purpose, each housing 1$^c$ is provided with a plurality of lugs 1$^{c'}$ and the casing 5 is provided with circumferential flanges 5', through which are formed aligned openings to receive bolts 7, and, as shown at 5$^{b'}$, the side walls of the casing 5 are formed with annular recesses to receive the end walls of the housings 1$^c$, this construction insuring also a rigid connection between the casing 5 and the housings 1$^c$. From this description it will be seen that each gear element 2 and its driving element, which is to be later referred to, are mounted in a closed chamber, which may hold a suitable lubricant for the gear elements.

7' indicates a horn or tubular member extending from the front side of the casing outer wall 5$^a$. The horn 7' is preferably formed integrally with the wall 5$^a$. At or near its opposite ends the horn 7' is shaped to form annular recesses to receive anti-friction bearings 8, 9, preferably of the tapered roller type. The rollers of one bearing are oppositely disposed to the rollers in the other bearing so as to take end thrusts in both directions. 10 indicates a shaft extending through the horn and supported therein by the bearings 8, 9. At its inner end the shaft 10 is provided with a bevel pinion 10ª, which meshes with the main bevel gear 6ª of the differential mechanism 6. The front end of the shaft 10 is adapted to be connected with the propeller shaft of the vehicle motor, preferably through a universal joint (not shown) in any well known manner. The inner race of the bearing 8 is preferably positioned against the rear side of the pinion 6ª, while the inner race of the bearing 9 is held in operative position by a collar 9ª, which in turn is held in place on the shaft 10 by the adjusting nut or nuts 12. 12ª indicates an annular cap fitted to the outer end of the horn 7' and surrounding the collar 9ª. This cap serves to close the outer end of the horn 7' to make it dust proof and also retain oil within the horn.

Of the differential mechanism 6, 6ᵇ indicates a housing to which the gear 6ª is secured in any desired manner. At opposite sides, the housing 6ᵇ is provided with sleeve shafts 6ᶜ which rotate in anti-friction bearings 13, 13. Each bearing 13 may be mounted upon one of the side walls 5ᵇ of the casing 5. For this purpose I provide a post or block 13ª, having a semi-circular curved wall 13ª', both of which may be formed integrally with the wall 5ᵇ. 13ᵇ indicates a cap, having a semi-circular wall, supported on and fixed to the block 13ª in any desired manner, preferably by cap screws 13ᶜ. As shown in Fig. 4, the curved walls of the block 13ª and cap 13ᵇ co-operate to enclose and support one of the bearings 13. The housing 6ᵇ is provided with a shaft 6ᵈ on which are mounted bevel pinions 6ᵉ, meshing with the bevel gears 6ᶠ.

14 indicates a pair of compensating shafts, each connected in any desired manner at its inner end to one of the gears 6ᶠ of the differential mechanism 6. Each shaft 14 extends through and is loosely mounted in the adjacent sleeve shaft 6ᶜ of the differential housing 6ᵇ. Each shaft 14 also extends through an opening formed in the adjacent side wall 5ᵇ and carries at its outer end a spur pinion 15 which meshes with the teeth of the adjacent internal gear 2. Each shaft 14 is preferably enlarged at or near its outer end to form a shoulder 14ª against which the outer end of the sleeve shaft 6ᶜ rests.

16 indicates a bearing and supporting wall provided on the outer face of each side wall 5ᵇ. The wall 16 is preferably formed integral with the wall 5ᵇ. It consists of a curved wall which is disposed in the vertical plane of the adjacent pinion teeth 15', the free ends of the latter being shaped to rotatively engage therewith. The wall 16 nearly surrounds the pinion 15, it being broken away at its upper portion to permit the teeth 15' to mesh with the gear 2. The curved walls 16 support the outer ends of the shafts 14 and co-operate with the bearings 13 to maintain them in alignment and proper position for transmitting the power from the differential mechanism 6 to the gears 2. By providing a bearing and support capable of receiving and rotatably supporting the pinion teeth 15', I am enabled to use relatively short intermediate power transmitting shafts, and to reduce the stresses thereon, thus insuring efficient co-action between the pinions 15 carried by these shafts and the adjacent gear elements 2.

The shafts 14 are arranged eccentrically to the axes of the axles 1ᵇ and preferably above them and in the vertical plane of said axles. As a result of this arrangement, the differential mechanism and the axis of the driving pinion therefor are elevated approximately to a horizontal plane coinciding to the horizontal plane in which the axes of the propeller shaft and the driving element therefor (not shown) are disposed, so that the shaft 10 and propeller shaft are normally disposed in a horizontal plane and axially relative to each other. By this arrangement the propeller shaft is enabled to transmit power to the shaft 10 through the universal joint between them with minimum friction losses, which result when the elements of the latter are caused to maintain an angular relationship while transmitting the power.

In the construction herein disclosed, it will be noted that I provide a set of gear elements between the differential mechanism or power transmitting devices 6 and each drive axle section and that each set of gear elements includes an internal gear, whereby the power of the engine may be transmitted to the drive axle section effectively and with minimum losses. It will also be noted that each set of gear elements is reduced to two, to-wit, an internal gear that is fixed to the inner end of the adjacent axle section 1ᵇ and a pinion 15 that is carried by the adjacent shaft 14 of the differential mechanism 6. A motor vehicle driving mechanism embodying my invention therefore consists of a relatively small number of elements, thus reducing the cost of manufacture and simplifying the assembly and disassembly of the mechanism as a whole. The herein disclosed construction is also further simplified and the cost thereof reduced to a minimum because each of the elements constituting the mechanism may be made relatively small in size.

By my construction I provide a dust proof and liquid tight housing for the differential mechanism and a separate dust proof and liquid tight chamber for each set of gear elements between the differential mechanism and the inner end of the adjacent drive axle section 1ᵇ.

In my construction the driven internal gears are mounted in housings which are adjacent to and rigidly connected to the casing for the differential mechanism. This permits me to provide relatively short shafts for transmitting the power to the internal gears. Accordingly, I am enabled to reduce and substantially eliminate bending strains upon the shafts, which usually exist in internal gear transmission types of construction.

The form of construction herein disclosed permits the differential mechanism and each tubular member 1ᵃ, axle section 1ᵇ and gear 2 to be assembled separately and then positioned for co-action by simply inserting the bolts 7 through the openings in the lugs 1ᶜ′ and flanges and applying suitable nuts to their free ends.

Furthermore, I am enabled to attain in a relatively simply form of construction, double speed reduction between the propeller shaft and the rear axle and to support and correlate the power transmitting elements for efficient operation, thereby insuring minimum friction losses and wear thereon.

To those skilled in the art, many alterations in construction and widely differing embodiments and applications of my invention will suggest themselves, without departing from the spirit and scope thereof. My disclosures and the description herein are purely illustrative and are not intended to be in any sense limiting.

What I claim is:

1. In mechanism of the class described, the combination with axle sections adapted to be connected to wheels of a vehicle, of a differential mechanism having compensating gears the axes of which are disposed eccentrically to the axes of said axle sections, a housing for said differential mechanism, driving connections between each said compensating gear and the adjacent axle section, one drive element of each said driving connection extending through a side wall of the housing, and bearings on the opposite sides of each side wall for rotatably supporting said drive element.

2. In mechanism of the class described, the combination with axle sections adapted to be connected to wheels of a vehicle, of a differential mechanism having compensating gears the axes of which are disposed eccentrically to the axes of said axle sections, a housing for said differential mechanism, driving connections between each said compensating gear and the adjacent axle section, one drive element of each said driving connection extending through a side wall of the housing, and bearings on the opposite sides of each side wall for rotatably supporting said drive element, one of said bearings being arranged to take end thrusts imparted to said element.

3. In mechanism of the class described, the combination with axle sections adapted to be connected to wheels of a vehicle, of a gear fixed to the inner end of each said axle section, a differential mechanism having shafts the axes of which are disposed eccentrically to the axes of said axle sections, a housing for said differential mechanism, said housing having side walls arranged between said gears and formed with openings through which said shafts extend, a pinion on each shaft in mesh with the adjacent gear, and bearings on the opposite sides of each housing side wall for supporting the adjacent shaft.

4. In mechanism of the class described, the combination of power transmitting devices, axle sections adapted to be connected to wheels of a vehicle, intermediate shafts connected to and driven by said devices, a casing for enclosing said power transmitting devices, the side walls of said casing being formed with openings through which said intermediate shafts extend, an internal gear carried by the inner end of each of said axle sections, a pinion carried by the outer end of each intermediate shaft and meshing with the adjacent internal gear, and a bearing on each side wall of said casing in which the adjacent pinion is rotatably supported.

5. In mechanism of the class described, the combination of power transmitting devices, axle sections adapted to be connected to wheels of a vehicle, intermediate shafts connected to and driven by said devices, a casing for enclosing said power transmitting devices, the side walls of said casing being formed with openings through which said intermediate shafts extend, an internal gear carried by the inner end of each of said axle sections, a pinion carried by the outer end of each intermediate shaft and meshing with the adjacent internal gear, a bearing on one side of each side wall of the casing in which the adjacent pinion is rotatably supported, and a thrust bearing on the opposite side of each side wall for supporting the adjacent intermediate shaft and taking end thrusts imparted thereto.

6. In mechanism of the class described, the combination with a differential mechanism having driven elements, of a closed casing therefor, the side walls of said casing being formed with eccentrically disposed openings through which said driven elements of said mechanism extend, pinions mounted on the outer end of said driven elements, tubular members having enlarged inner ends connected to said casing and co-operating with the side walls thereof to form closed chambers, axle sections mounted in said tubular members, and gears fixed to the inner ends of said axle sections, mounted in the said closed chambers and meshing with the pinions mounted on the outer end of said driven elements.

7. In mechanism of the class described, the combination with a differential mechanism having driven elements, of a closed casing therefor, the side walls of said casing being formed with eccentrically disposed openings through which said driven elements of said mechanism extend, pinions mounted on the outer end of said driven elements, tubular members having enlarged inner ends connected to said casing and co-operating with the side walls thereof to form closed chambers, axle sections mounted in said tubular members, and gears fixed to the inner ends of said axle sections, mounted in the said closed chambers and meshing with the pinions mounted on the outer ends of said driven elements.

8. In mechanism of the class described, the combination with a differential mechanism having driven elements, of a closed casing therefor, the side walls of said casing being formed with eccentrically disposed openings through which said driven elements of said mechanism extend, pinions mounted on the outer end of said driven elements, tubular members having enlarged inner ends detachably connected to said casing and co-operating with the side walls thereof to form closed chambers, axle sections mounted in said tubular members, and gears fixed to the inner ends of said axle sections, mounted in the said closed chambers and meshing with the pinions mounted on the outer ends of said driven elements.

9. In mechanism of the class described, the combination with a differential mechanism having driven elements, of a closed casing therefor, the side walls of said casing being formed with eccentrically disposed openings through which said driven elements of said mechanism extend, pinions mounted on the outer end of said driven elements, tubular members having enlarged inner ends connected to said casing and co-operating with the side walls thereof to form closed chambers, axle sections mounted in said tubular members, and internal gears fixed to the inner ends of said axle sections, mounted in the said closed chambers and meshing with the pinions mounted on the outer ends of said driven elements.

In testimony whereof I affix my signature.

LEO MELANOWSKI.